Oct. 4, 1955　　　　　　H. C. FLINT　　　　　2,719,578
SEATING SPRING CONSTRUCTION
Filed June 28, 1950　　　　　　　　　　　　2 Sheets-Sheet 1

INVENTOR.
Hyland C. Flint.
BY
Harness, Dickey & Pierce
ATTORNEYS.

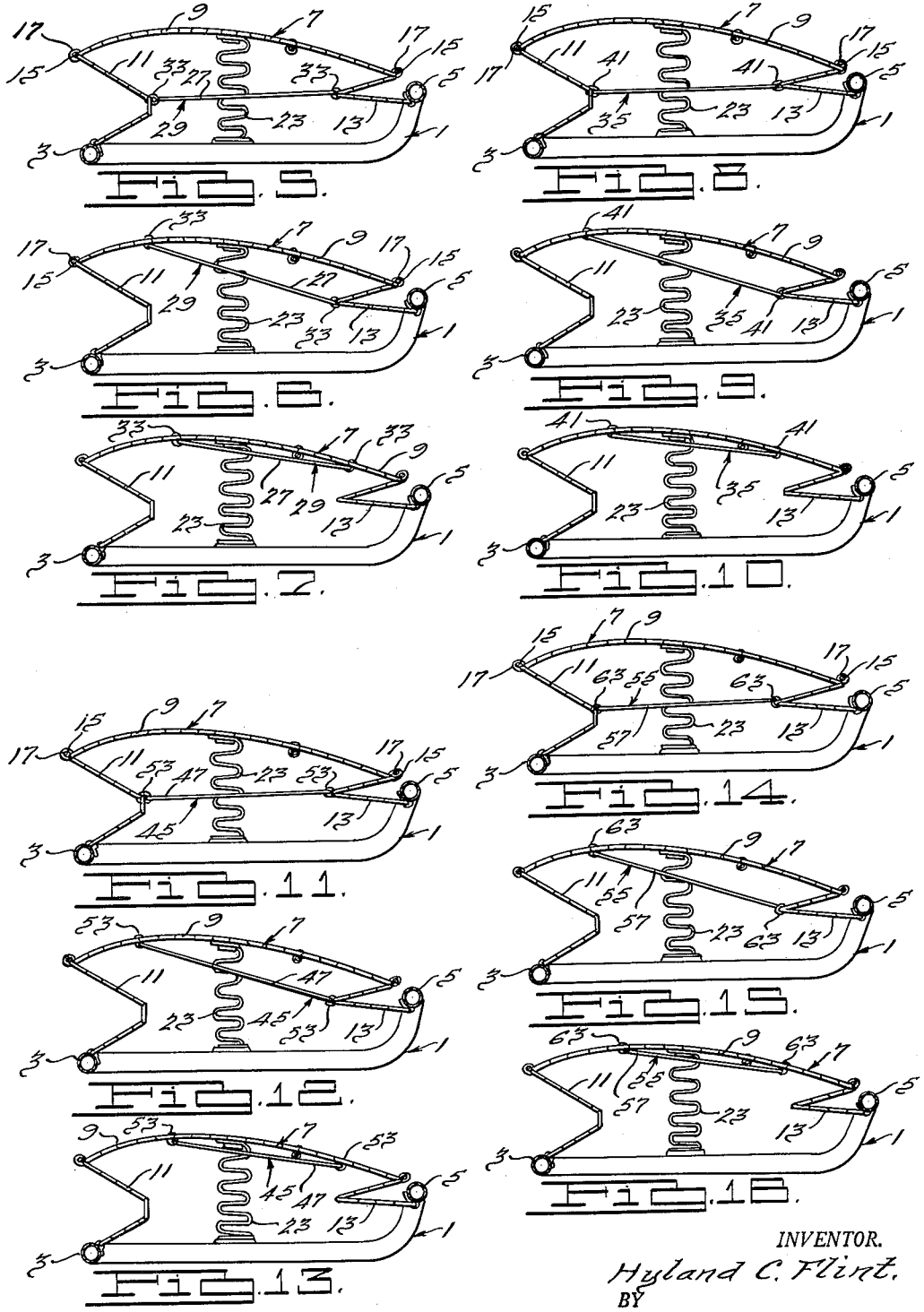

United States Patent Office 2,719,578
Patented Oct. 4, 1955

2,719,578
SEATING SPRING CONSTRUCTION

Hyland C. Flint, Birmingham, Mich., assignor to American Metal Products Company, Detroit, Mich., a corporation of Michigan Application June 28, 1950, Serial No. 170,901
4 Claims. (Cl. 155—179)

This invention relates to spring constructions and, in particular, to those embodying sinuous or zigzag springs of the type disclosed and claimed in Kaden Reissue Patent No. 21,263.

Sinuous spring strips have become increasingly popular in recent years as the basis for resilient spring constructions such as are employed in automobile seat and back cushions. The sinuous spring strips are formed of zigzag spring wire that is preferably prearched in accordance with the aforementioned Kaden Reissue Patent No. 21,263, and ordinarily comprise a web portion that provides the resilient surface and end portions that are bent beneath the web portion and connected to a frame to resiliently support the web. A plurality of sinuous spring strips are ordinarily used in a spring construction and, in the usual type of automobile seat or back, the web portions extend parallel to the longitudinal center line of the vehicle and are transversely spaced from each other.

In spring constructions of this type, there is the desire, on the one hand, to maintain the size of the spring wire and thus the cost of manufacture at a minimum and, on the other hand, to obtain optimum cushion contours and spring rates or resiliency. These factors are brought into somewhat of a conflict by the rather long length or span of the web portion of each sinuous spring strip and the fact that loads are not evenly distributed along the length of the web. In seat constructions, especially, more satisfactory results seem often to be obtained by supporting the web of each strip with an auxiliary sinuous spring section that may be connected across the end portions of the strip or to an intermediate point on the web. The present invention concerns the use of relatively rigid bracing rods to furnish such additional support for the webs of sinuous spring strips. It has been found that the invention provides a spring construction which satisfactorily resolves the conflicting considerations mentioned above so that proper resiliency and contour are obtained with a light gage spring wire that may be readily manufactured into spring constructions.

Figure 1:
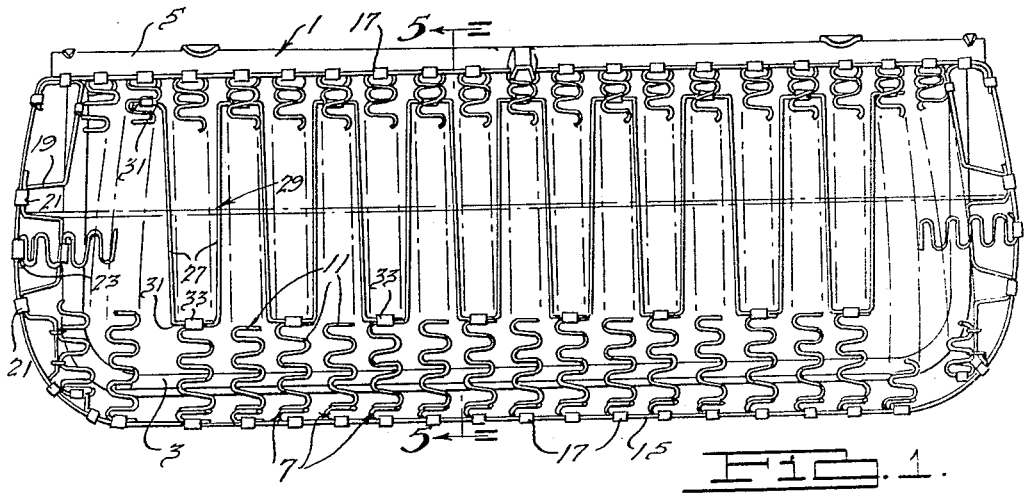
Figure 2:
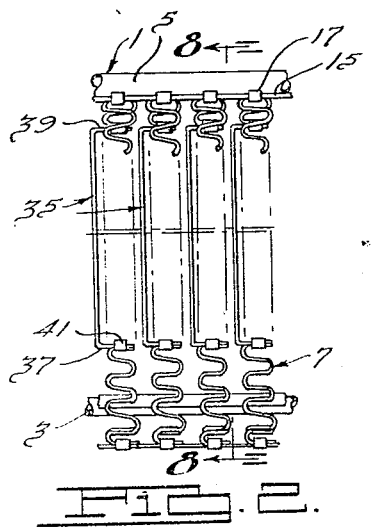
Figure 3:
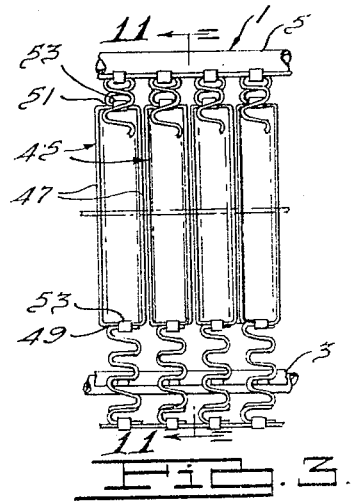
Figure 4:
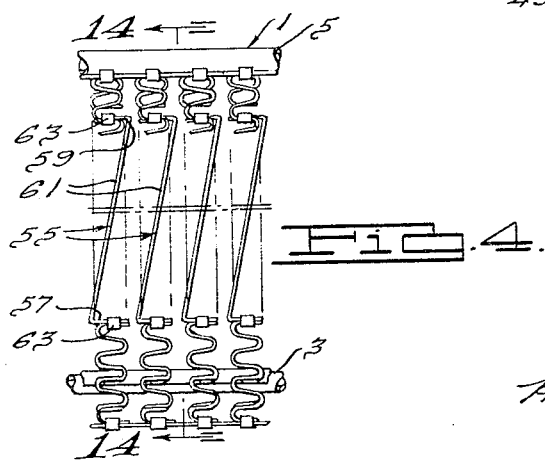

Objects and features of the invention will appear upon consideration of the accompanying drawings, wherein:

Figure 1 is a plan view of an automobile seat construction with upholstery and padding removed that embodies one form of the present invention;

Figs. 2, 3, and 4 are plan views with parts broken away of seat constructions embodying modified forms of the invention;

Figs. 5, 6, and 7 each represent a section taken along the line 5—5 of Fig. 1 and show various ways in which the bracing member may be secured to the spring strip;

Figs. 8, 9, and 10 represent sections taken along the line 8—8 of Fig. 2 and show various ways that the bracing member of Fig. 2 may be secured to the sinuous spring strip;

Figs. 11, 12, and 13 each represent a section taken along the line 11—11 of Fig. 3 and show various ways in which the bracing member of Fig. 3 may be connected to the sinuous spring strip; and Figs. 14, 15, and 16 represent sections taken along the line 14—14 of Fig. 4 and show various ways in which the bracing member of Fig. 4 may be connected to the sinuous spring strip.

Referring now to the drawings, a seat construction has been selected to illustrate the principles of the invention though it will be evident that the novel features thereof may be embodied in other types of spring constructions. The present seat, which is adapted especially to serve in automobiles, has a frame 1 that is preferably formed of tubular material and which includes a front rail 3 and a rear rail 5 which is parallel to the front rail and which, in the case of front seats, may be elevated above it to provide toe room for the occupants of the rear seat of the automobile. A plurality of substantially identical sinuous spring strips 7 are mounted upon the frame 1. While these spring strips may be of various forms, those illustrated herein have an arched web 9 and front and rear end portions 11 and 13 bent beneath the web to serve as resilient supports for it. The front and rear portions illustrated are of V-shape wherein the V lies horizontal and opens outwardly, the front V-shaped resilient support being of greater depth than the rear support in the springs illustrated. The ends of each strip, that is the last section of wire on the front and rear portions 11 and 13, are secured to the front rail and the rear rail by means of suitable clips, these connections preferably being non-pivotal at the front rail 3 and pivoted at the rear rail 5. The springs 7 are arranged so that they extend longitudinally of the automobile and are transversely spaced from one another so that their webs 9 define a common resilient seating surface. A border wire 15 may be extended around the marginal portions of the resilient surface and connected by suitable clips 17 to the front and rear ends of the webs 9 and by means of spacer wires 19 and clips 21 to the marginal springs 7. Further resilient support may be provided for the resilient surface by means of outwardly opening V-shaped sinuous spring elements 23 that extend transversely to the other springs 7 and which are connected at one end to the border wire 19 and at their lower ends to the side rails of the frame 1 to furnish side support for the resilient surface.

The weight of the occupant is ordinarily concentrated in the rear half of the seat, that is the rear half of the webs 9 of the sinuous strips 7. It is thus necessary to provide a sinuous spring unit which is capable of withstanding such loads with the proper degree of resiliency and which will maintain the proper seat contour both during the application of and after the release of seat loads. While supporting the heavier loads at the rear, the sinuous spring unit must be relatively soft in its front portions so as to feel comfortable to the legs of an occupant which extend thereover. These features of proper contour and different spring rates over the length of the web are provided in this invention by relatively rigid bracing rods that are connected, preferably pivotally, to fore and aft points on the sinuous spring strips. In the form of the invention shown in Fig. 1, the bracing rods for each of the sinuous spring strips 7 comprise parallel sections 27 on a continuous rod 29. The rod 29 is of sinuous shape and has rebent loops 31 which alternately integrally join the front ends and the rear ends of adjacent rod sections 27. The sinuous rod 29 is arranged so that its straight sections 27 extend longitudinally or parallel to the webs 9 and are located in the spaces between the webs. The loop sections 31 are secured by means of clips 33 to suitable straight sections of the loops of the strip, adjacent loops 31 being thus secured to adjacent strips 7. As indicated in Figs. 5–7, there are several points on the strip to which the loops 31 may be secured by the clips 33. Preferably, the rear loops are secured to the apex of the V-shaped rear end supports 13 and the front loops secured to points on the webs 9 that are spaced somewhat forwardly of the center thereof as shown in Fig. 6. If desired, however, the front loops 31 of the rod 29 may be connected to the apex of the V-shaped front supports 11 and the rear loops 31 to the apex of the V-shaped rear end supports 13 as shown in Fig. 5. A further modification is illustrated in Fig. 7 wherein both the forward and rear loops 31 of the rod 29 are connected to points on the webs 9.

Instead of using a continuous rod 29 to provide the bracing sections 27, individual bracing rods may be employed for each spring strip 7. A preferred form is shown in Figs. 2 and 8–10 wherein the bracing rod 35 has front and rear end sections 37 and 39 that are bent at right angles so as to extend transversely to the strips 7 and parallel to the straight portions of the loops thereof. The ends 37 and 39 are secured by clips 41 to straight portions on the strip 7 and it will be noted that the bracing portion of the rod lies between the webs 9 rather than underneath so that the possibility of contact with the webs is eliminated. The bracing rods 35 may be secured to various parts of the spring strips 7 as already indicated in connection with bracing element 29. Thus, in preferred form, the rear end 39 of the rod 35 is secured by a clip 41 to the apex of the rear end portion 13 and the forward end 37 is secured by a clip 41 to an intermediate point on the web 9 as shown in Fig. 9. If desired, however, the ends 37 and 39 may be secured to the apexes of the front and rear V-shaped end portions 11 and 13 as shown in Fig. 8. Further, the end portions 37 and 39 of the rod may be secured to spaced points on the web 9 as shown in Fig. 10.

In the modification of Figs. 3 and 11–13 the bracing rods 45 are closed loops which have longitudinal side portions 47 and transverse end sections 49 and 51 at the front and rear thereof. The ends 49 and 51 are wider than the spring strips 7 so that the sides 47 are spaced between adjacent webs 9 of the spring strips when the ends 49 and 51 are secured by clips 53 to the strips. The braces 45 may be endless or may be split at one end, which split is covered up by a clip 53. The braces 45, like the previous braces, may be secured to various points on the strips 7. Preferably, the rear end portion 51 is secured to the apex of the rear end portion 13 of the strip 7 while the front end 49 of the brace 45 is secured to an intermediate point on the web 9 as shown in Fig. 12. If desired, however, the front and rear ends 49 and 51 of the brace 45 may be secured by clips to the apexes of the front and rear V-shaped supports 11 and 13 for the web 9 as shown in Fig. 11. Further, the front and rear sections 49 and 51 of the brace 45 may be connected to spaced points on the web 19 itself as shown in Fig. 13.

Another suitable form of brace is illustrated in Figs. 4 and 14–16. This brace 55 is Z-shaped comprising front and rear transverse end sections 57 and 59 that are joined by a longitudinal rod section 61 that extends from one side of the rear section 59 to the other side of the front section 57 so that it is inclined to the direction of the strip of the web 9 and lies underneath it; if desired, a buffer pad (not shown) may be used to eliminate the possibility of clicking. The ends 57 and 59 are secured by clips 63 to desired points on the sinuous spring strips. Preferably, the rear end 59 is connected to the apex of the V-shaped rear end portion 13 and the front end 57 is connected to an intermediate point on the web 9 as shown in Fig. 15. If desired, however, the front and rear sections 57 and 59 of the bracing rod 55 may be secured to the apexes of the front and rear V-shaped end supports 11 and 13 as shown in Fig. 14. Further, the front and rear transverse sections 57 and 59 of the bracing rod 55 may be secured by the clip 63 to longitudinally spaced points on the web 9 as shown in Fig. 16.

In the preferred form, as illustrated in Figs. 6, 9, 12, and 15, the lower arm of the spring portion 13, the wire portions 27, 35, 47 or 57 and the forward portion of the web 9 forms a primary support for the majority of the load. The rearward portion of the web 9 and the upper arm of the end portion 13 forms a secondary support superimposed upon the primary support. The secondary support may operate substantially independently of the primary support after a load has been applied to the cushion to add comfort to the combined supports at the rear portion of the cushion. In other words, the secondary support provides softness and resiliency at the rear of the cushion during the movement of the vehicle while the main load is supported by the primary support. This is effected primarily by the inability of the lower arm of the portion 13 to freely pivot downwardly any substantial amount and the fact that the upper arm is free to deflect downwardly relative thereto leaving the edge formed by the border wire 15 free to deflect independently of the rear rail 5.

What is claimed is:

1. In a seating structure having front and rear frame members, a spring assembly comprising in combination; a spring strip made of wire bent back and forth to provide oppositely disposed adjacent loops joined by torsion bars, said strip being longitudinally elastic by reason of said loop construction, said strip having an elongated web and support sections at either end thereof, one of said support sections being attached to said front frame member and the other support section being attached to said rear frame member, said rear support section including a two-legged V-shaped portion opening away from said web and having the uppermost leg attached to said web and the lowermost leg attached to said rear frame member, the apex of said V extending beneath said web, and a bracing rod connected at one end to said rear support section and at the other end to said web intermediate the ends thereof, said bracing rod comprising a central portion having bent portions at the ends thereof, said bent portions extending away from said central portion generally normal thereto, one of said bent portions being attached to a torsion bar in said web, the other of said bent portions being attached to said rear support section adjacent to the apex of said V, said bracing rod, said uppermost leg and said web connected therebetween forming a support triangle having two depending sides and having a third longitudinally extensible and compressible side including some of said torsion bars, said lowermost leg and bracing rod constituting a primary load support, and said uppermost leg and web constituting a body conforming support capable of exercising an independent support function while maintaining a predetermined contour.

2. A spring assembly as set out in claim 1 wherein said bracing rod is substantially U-shaped with said bent portions extending outward from the central portion of the bracing rod in the same direction.

3. A spring assembly as set out in claim 1 wherein said bracing rod is substantially Z-shaped with said bent portions extending outward from the central portion of the bracing rod in opposite directions.

4. A spring assembly as set out in claim 1 wherein said lowermost leg in said V-shaped portion is longer than said uppermost leg.

References Cited in the file of this patent

UNITED STATES PATENTS

| | | |
|---|---|---|
| 2,022,892 | Marshall | Dec. 3, 1935 |
| 2,047,411 | Freund | July 14, 1936 |
| 2,201,997 | Freund | May 28, 1940 |
| 2,253,914 | Probst | Aug. 26, 1941 |
| 2,311,145 | Widman | Feb. 16, 1943 |
| 2,330,906 | Neely | Oct. 5, 1943 |
| 2,356,417 | Mayer | Aug. 22, 1944 |
| 2,386,456 | Haberstrump et al. | Oct. 9, 1945 |
| 2,565,021 | Flint | Aug. 21, 1951 |

FOREIGN PATENTS

| | | |
|---|---|---|
| 232,312 | Great Britain | Apr. 14, 1925 |